UNITED STATES PATENT OFFICE.

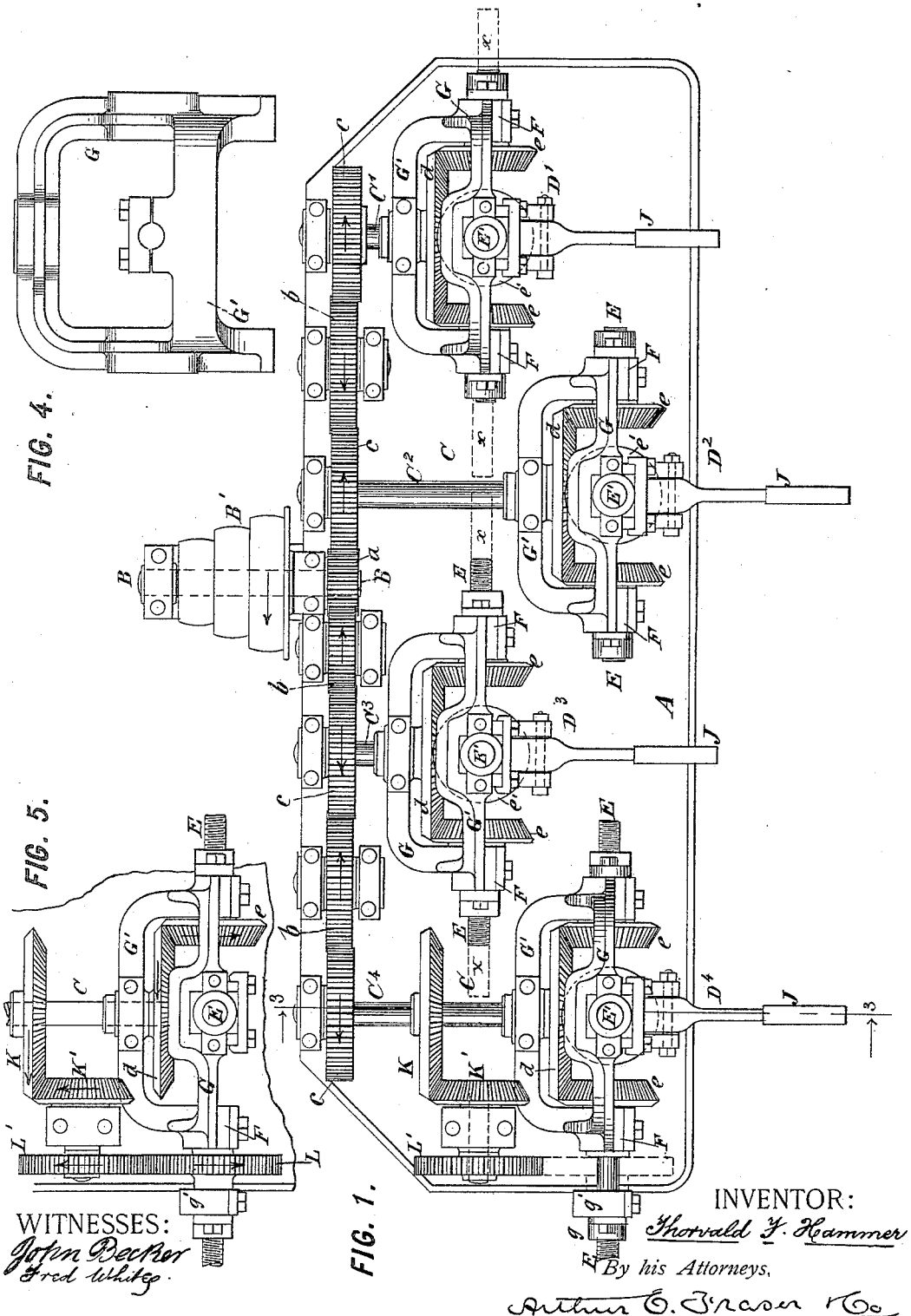

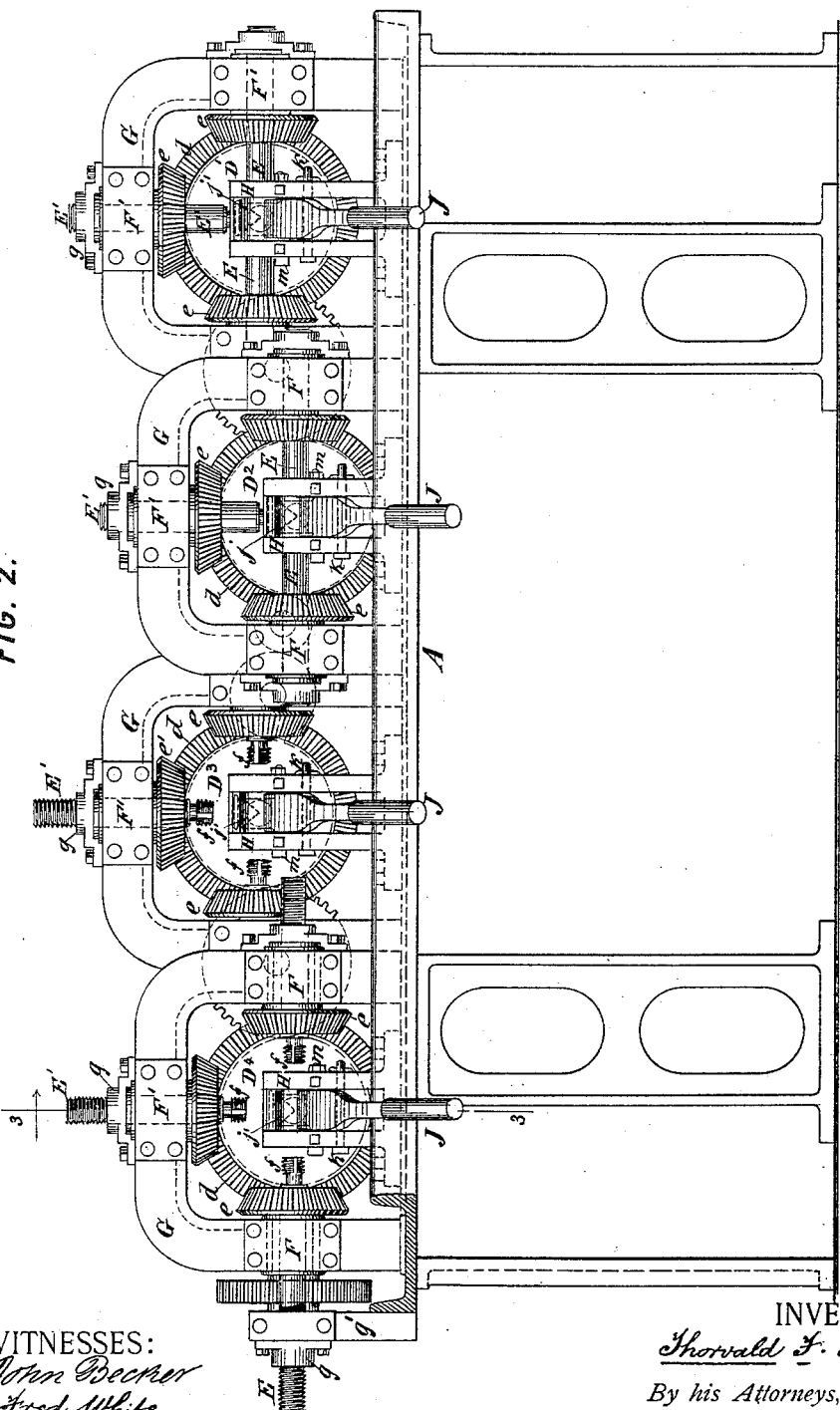

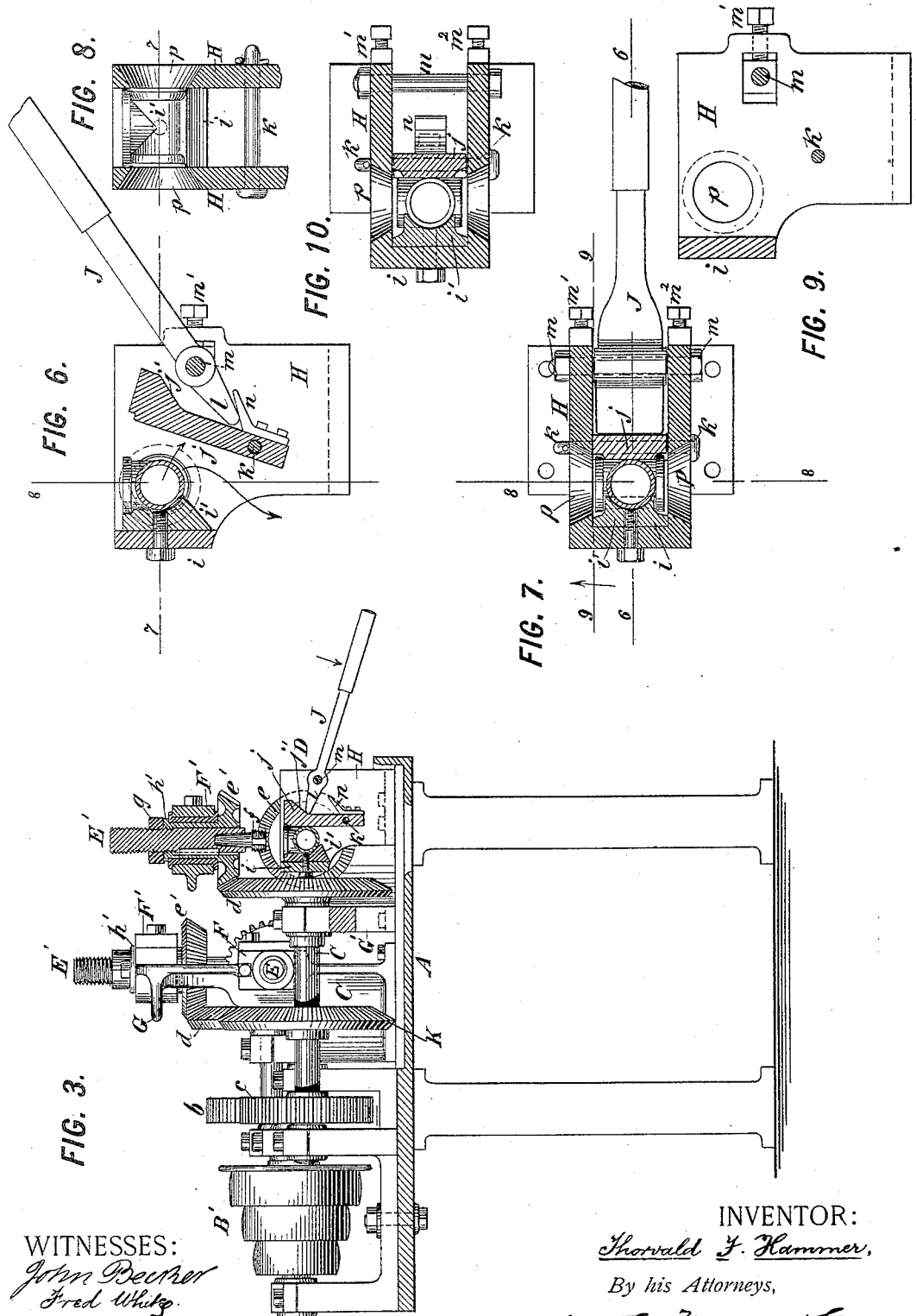

THORVALD F. HAMMER, OF BRANFORD, CONNECTICUT.

BORING AND SCREW-CUTTING MACHINE.

SPECIFICATION forming part of Letters Patent No. 445,175, dated January 27, 1891.

Application filed March 3, 1890. Serial No. 342,420. (No model.)

*To all whom it may concern:*

Be it known that I, THORVALD F. HAMMER, a citizen of the United States, residing in Branford, New Haven county, Connecticut, have invented certain new and useful Improvements in Boring and Screw-Cutting Machines, of which the following is a specification.

This invention relates to machines for drilling, boring, reaming, and tapping, or screw-cutting, designed to operate in rapid succession upon small pieces or fittings—such, for example, as pipe T's or elbows.

The particular machine in which I have shown my invention as embodied is one for tapping T-joints for pipe-fittings. The same machine might be used for tapping elbows or for cutting right and left threads in straight unions or thimbles, or by changing the working-tools it might be used for boring, drilling, or reaming holes in pipe-fittings or other analogous pieces.

The improvements introduced by my present invention relate both to the chucks for holding the work while under the action of the tools and to the general construction and arrangement of the apparatus.

The object of my invention is to provide a construction of machine with multiple spindles and chucks for acting on a number of pieces of work in order to render the operation very rapid and enable the machine to operate to the utmost capacity of the attendant in feeding the work to it.

My present machine in some degree resembles the machine patented to me May 8, 1888, by Patent No. 382,606. In that machine, as in my present machine, the taps or other cutting-tools are arranged to act upon four pieces of work at the same time, two sets of taps entering the work while the other two sets are retreating, so that the attendant feeds the work first to two of the chucks and then to the other two alternately. The taps or other cutting-tools are carried on spindles arranged at right angles to each other, and in the case of tapping pipe-elbows the two or more spindles acting upon each elbow or other piece of work are caused to advance and retreat simultaneously. The chuck by which the work is held consists of a fixed and movable jaw, the latter forced or wedged against the fixed jaw by the action of a lever, so that it grips the work after the manner of a clamp, one of the jaws, which is preferably the fixed one, being formed with recesses into which the work will enter, and thereby be exactly centered and held inflexibly in place during the action of the cutting-tools.

My present invention, in addition to enabling the machine to operate by means of three cutters to tap T-fittings, instead of being merely organized to tap elbows, is, furthermore, so constructed that it admits of much more rapid operation than my previous machine and of more convenient change from one style of work to another—as, for example, from tapping threads of one gage to tapping those of a different gage, or from right-hand to left-hand threads.

Figure 1 of the accompanying drawings is a plan view of my entire machine. Fig. 2 is a front elevation thereof. Fig. 3 is a vertical transverse section on the line 3 3 in Figs. 1 and 2. Fig. 4 is a rear elevation of one of the arched frames removed. Fig. 5 is a plan of a fragment of Fig. 1, showing one of the tapped spindles geared to cut a left-hand thread. Fig. 6 is a vertical section in the same plane as Fig. 3 of one of the chucks detached, showing it thrown open, the view being on a larger scale than the preceding figures. Fig. 7 is a horizontal section thereof on the line 7 7 in Figs. 6 and 8, but showing the chuck closed, as in Fig. 3. Fig. 8 is a vertical section on the line 8 8 in Figs. 6 and 7. Fig. 9 is a fragmentary vertical section looking in the same direction as Fig. 6 in the plane of the line 9 9 in Fig. 7. Fig. 10 is a horizontal section similar to Fig. 7, but showing a slight modification.

Referring first to the general views, let A designate a table or bed-plate on which the frames carrying the working parts are mounted, and which is itself preferably elevated on legs or feet to a convenient height. Mounted in suitable bearing-frames over this table is a driving-shaft B, having pulleys B' fixed on it or being otherwise provided with means by which power may be applied to it to drive the secondary driving-shafts C C, which are driven from the shaft B through a pinion *a*, fixed on the latter, gears *c c*, fixed on the shafts C C, and intermediate or idler gears *b b*. The secondary driving-shafts C C are equal in number to the number of chucks for holding work to be operated on, being four in number in the machine shown. This number I find to be preferable, as it is that which one workman can most effectively keep supplied with work. The four chucks are lettered D D, being distinguished as D', D², D³, and D⁴, respectively. The secondary driving-shafts are in like manner distinguished by being numbered C' C² C³ C⁴, respectively. The spindles carrying the drills, reamers, taps, or other cutting-tools of one working-head, being that for operating upon the work held in one chuck, are all driven from the shaft C pertaining to that chuck.

The four chucks, with their spindles and the means for driving them, are all constructed alike. I will therefore describe the construction of only one. The shaft C carries on its front end a bevel-gear $d$, which meshes with bevel-gears $e\ e\ e'$ on the three spindles E E and E', respectively, all of which are arranged to rotate from the axis of the shaft C. For tapping ordinary T-fittings the two spindles E E will extend horizontally in line with each other on opposite sides, while the third spindle E' will be arranged vertically and at right angles to the horizontal ones, as shown. Each spindle carries a tap or other cutting-tool $f$ on its end nearest the chuck and is threaded with a screw of corresponding pitch on its outer end, which turns in a fixed nut $g$, as usual in tapping-machines. The bevel-gear $e$ or $e'$ connects with its spindle through the medium of a spline or feather, as shown with reference to the spindle E' in Fig. 3, so that it imparts rotary motion to the spindle while the latter travels in or out, as determined by the engagement of its screw thread with the nut $g$, as is usual in tapping-machines. The bevel-gears $e$ and $e'$ are provided with long hubs $h$ and $h'$, respectively, which turn in suitable bushings in bearing-boxes F F F', respectively, and are formed with suitable shoulders engaging the ends of the boxes, by which their longitudinal displacement is prevented, and they are kept in proper mesh with the gear $d$ while the spindles E E' advance and retreat by moving longitudinally within them. The three bearing-boxes F F F' are supported in an arched frame G, which is bolted to the table A. These frames G are shown in front elevation in Fig. 2, in plan in Fig. 1, and in side elevation and vertical section in Fig. 3. One of the frames detached is shown in rear elevation in Fig. 4. Each frame consists of two uprights united at the top by a horizontal portion, forming approximately an arch, the bottoms of the uprights being provided with flanges which rest on and are fastened to the table. Across the middle portion of the frame is extended a cross-frame G', which is carried to the rear of the main portion of the frame, as best shown in the plan view, Fig. 1, and which serves as a bearing for the shaft C. In the front side of the arched frame are formed three deep recesses, one at each side and one at the top, to receive the boxes F F F', respectively. These boxes after being placed in the recesses are fastened therein by bolts, screws, or by fastening on a cap-plate, as shown, or in any other convenient or suitable manner. The fixed nuts $g\ g$ are fastened to the arched frame G or to the bearing-boxes by screws or other suitable fastenings, with the exception of the nut $g$ at the left-hand end of the machine, which is fastened to a separate frame $g'$, bolted independently to the table A, as rendered desirable, by a construction which will be hereinafter described.

The gearing $a\ b\ c$ is so arranged that the secondary shafts C' C² revolve in one direction while the shafts C³ C⁴ are revolving in the opposite direction. The driving-shaft B receives motion first in one direction and then in the other, transmitted to it through a belt from any suitable reversing gear. As such belt-reversing gears are well known and form no part of this invention, I have not shown such gear in the drawings. While the shaft is driven in one direction the tap-spindles driven by the shafts C' and C² are caused to simultaneously enter the work, while at the same time the spindles driven by the shafts C³ C⁴ are turning backward so as to retreat from the work. When the driving-shaft is turned in the opposite direction, the taps driven by the shafts C³ and C⁴ will enter the work, while those driven by the shafts C' and C² will retreat. This relative motion of the respective shafts is derived in the construction shown by gearing the driving-pinion $a$ directly with the gear $c$, through which the shafts C' and C² are driven, while between the pinion $a$ and the gear $c$, through which the shafts C³ and C⁴ are driven, is interposed an idler gear or pinion $b'$ to reverse the motion.

As the bevel-gear $d$ of each working-head meshes simultaneously with the bevel-gears $e\ e\ e'$, which are arranged around it, and as these gears are of the same size, it necessarily results that the three spindles E E E' turn in the same direction, so that if the tools they carry are right-hand taps the threaded taps will simultaneously enter the work while the spindles are revolving in one direction and will simultaneously retreat therefrom during the rotation in the opposite direction.

Each of the chucks D is of the construction best shown in Figs. 6 to 9. It consists of a frame H, formed of two uprights united by a rear plate $i$, the whole preferably cast in one piece. The plate $i$ constitutes, essentially, the fixed jaw of the chuck or clamp. Against it is fixed a facing plate or piece $i'$, which is formed with a recess or cavity of such shape as to receive and center the pipe-fitting or other article to be acted upon. The movable jaw $j$ consists of a strong plate pivoted on a transverse pin $k$ and having a flat face, which, as it is closed, comes tangentially against the fitting and grips the latter by forcing it tightly against the fixed jaw. The movable jaw is closed against the fixed jaw by a lever J, the long arm of which projects to form a handle, while its short arm *l* stands in front of the movable jaw in position such that as the long arm of the lever is turned down to the position shown in Fig. 3 this short arm, by acting against the front or outer face of the jaw, forces or wedges the latter firmly against the fixed jaw. To this end the movable jaw is formed on its front side with a cam-face *j'*, against which the short arm *l* of the lever acts as the jaw reaches or approaches the closed position. This cam-face *j'* is to this end made slightly eccentric to the center of the rod *m*, on which the lever J is pivoted, so that the short arm of the lever acts like a radially-movable wedge to force the movable jaw more tightly against the work the farther down the lever is turned. Preferably the rod *m* is mounted at its opposite ends in sliding blocks *m'*, adjustable toward and from the fixed jaw by screws $m^2$, engaging the side pieces of the frame H, in order that the lever may be adjusted to take up wear and to press the movable jaw back to a greater or less distance to accommodate slightly larger or smaller work. This means of adjustment, however, is not essential.

To open a chuck the lever J is thrown up to the position shown in Fig. 6, whereupon its short arm strikes a finger or arm *n*, fastened to the lower front side of the movable jaw, and tilts the latter back to the position shown in Fig. 6, whereupon the work falls out, as denoted by the arrow in Fig. 6. Thus the simple movement of the lever J in one direction or the other opens or closes the chuck, the downward movement of the lever wedging the chuck so firmly closed as to cause it to powerfully grip the work and hold it during the action of the cutting-tools. The preponderance of the weight of the long arm of the lever J causes it when turned down to close the chuck to tend to move still lower, so that its effect is to tighten instead of loosen the chuck. The chuck is constructed to hold the T-fitting or other work with the main axis of the T in line with the axis of the two tap-spindles E E and the side branch of the T directed upwardly with its axis in line with that of the vertical tap-spindle E'. The vertical tap enters the fitting through the top of the frame H, which is entirely open, while, to make room for the horizontal taps to enter, the opposite sides of the frame H are formed with openings *p p*, as shown in Figs. 7 and 8.

In my previous patent, No. 382,606, the drill-spindles work in a horizontal plane and the pipe, elbow, or other fitting is held with its axes in a horizontal plane by being pressed against a fixed horizontal upper jaw by means of the movable horizontal lower jaw of the chuck. With that chuck, when the chuck is opened by dropping the lower jaw, the work descends with the lower jaw, and when the latter has descended far enough to impart to it sufficient slope the work slides down its inclined surface and falls out into a chute or receptacle. To accomplish this it is necessary, first, to carry the lower jaw downwardly to a considerable distance, and, secondly, to cause the tap or cutting-tool to retreat some distance beyond the work in order to afford clear room for the latter to fall out beneath the tap, as will be apparent by an examination of Fig. 5 of the drawings of my said patent.

In my present machine I arrange the tap-spindles to work in a vertical plane, and I construct the chuck with its fixed jaw standing vertically and with its movable jaw to press the work backwardly against the fixed jaw, itself assuming a vertical position when closed. When the chuck is opened, the work immediately falls out, irrespective of the inclination of the movable jaw, as soon as the movable jaw is opened far enough to let the work pass between it and the fixed jaw. The work thus drops away from the tap, which acts from above, instead of falling past and beneath a horizontal tap, as in the construction of chuck as shown in my previous patent.

It will be understood that the tap-spindle lettered *l'* in Fig. 5 of my previous patent corresponds to the vertical spindle E' of my present machine.

The result of my improved construction is that it is necessary only for the tap to retreat far enough to pass out of and clear the work, whereupon the chuck can be at once opened instead of it being necessary for the tap to retire a considerable distance after leaving the work, as was formerly essential in order that the work might fall out beneath the tap. Hence with my new machine the time occupied in running a tap thus idly backward and then again forward before it can enter the next work is saved, so that the capacity of the machine is materially increased. So far as the lateral tap-spindles E E are concerned there is no material difference in the operation of my new machine.

My improved chuck has also the advantage that the work is held with absolute rigidity, since the movable jaw is pressed up by the wedging action of the lever, which stands in a direct line between the work and its fulcrum, as shown in Fig. 3, and this lever is not seated on springs, as in the case of the lever used for closing the chuck in my former patent. The spring there employed, in order to accommodate the chuck to slight inequalities in the work, (some of the pieces or fittings being slightly thicker than others,) is rendered unnecessary in my improved chuck by reason of the construction of the movable jaw *j* with a cam-face *j'*, so that the lever can move a greater or less distance up this cam-face, according as the work is slightly smaller or larger.

The improved arrangement of the lever found in my present invention also is of great advantage, since the operator can press it down very forcibly, whereas formerly in tightening the chuck he had to press backwardly against an upwardly-projecting lever. The lever is also simplified and strengthened by being made all in one piece and entirely within or between the sides of the frame H, whereas previously the lever was a crank-arm extending outside of the frame and connecting through a rock-shaft with a toggle-arm within the frame.

By reason of the construction of the tap-spindles to be driven all from one gear $d$ through bevel-wheels meshing therewith the changing of any one or more of the tapping devices from one kind or class of work to another is greatly facilitated. Thus any one or more of the tapping devices may be changed to cut a fine or a coarser thread without interfering with the others and with the minimum of labor and confusion. To do this it is only necessary to remove from the frame G the three boxes F F F', whereby the three tap-spindles and taps are detached from the machine with their bevel-gears $e\ e\ e'$, whereupon a new set of spindles may be put on in their place. By having the spindles and gears of different sizes of screw-threads ready connected those of one size may be taken off and those of another size applied very quickly. The nuts $g\ g$ may be fastened to the boxes so as to be removable with them, or they may be separately fastened to the frame G. The construction of the frame G with the recesses to receive the boxes all on the front side greatly facilitates the removal and replacement of the boxes, and by making the frames all alike in respect of these recesses the boxes are made interchangeable from one frame to another. The frame G by being arched overhead and backwardly is rendered very strong and unyieldingly supports the several tap-spindles in correct relation to each other and to the axis of the shaft C, since the latter has its bearings in the rear portion G' of the frame.

In order to cut a T-fitting or thimble with a right-hand thread at one end and a left-hand thread at the other, it is necessary to replace one of the horizontal tap-spindles E by a spindle having a left-hand screw-thread and tap working in a left-hand nut and turning in the opposite direction to the spindle it replaces. This is accomplished in the manner shown in Fig. 5.

On the shaft C is fixed a bevel-gear K, Figs. 1 and 5, meshing with a gear K', on the shaft of which is a spur-gear L'. Ordinarily the gears K, K', and L' revolve idly, as shown in Fig. 1. When, however, it is desired to cut a left-hand thread, the spindle E at the left hand of the frame G is taken bodily out with its gear $e$, and its nut $g$ is also removed and in its place is substituted a left-threaded spindle and tap turning in a left-threaded nut. This spindle is unprovided with any bevel-gear $e$, but has instead a spur-gear L outside of the frame G and arranged to mesh with the gear L', as shown in Fig. 5. This spindle is consequently rotated in the opposite direction by reason of the intermediation of gears K' L'. I have shown provision for cutting left threads in this manner as applied to only one of the four heads or tapping devices in Fig. 1, this being ordinarily sufficient; but, obviously, the same arrangement of change-gearing may be applied to all of the tapping devices. The nut $g$ of this tapping device is shown detached from the frame G and mounted on a separate standard $g'$ in order to admit the gear L between, which I consider the most convenient arrangement; but it is not essential.

It will be observed from Fig. 1 that I have arranged the several tapping heads or devices in alternate order successively toward the front and rear. This is done in order to render the machine compact, since if all four of the tapping devices or heads were arranged in line and sufficiently far apart to allow the necessary reach for the retreat of the spindles the machine would be rendered inconveniently long and the chucks would be too far apart to be easily reached and fed by one attendant. By the arrangement shown the attendant can readily reach past the forward heads in order to feed a fitting into the chuck $D^3$ of the intervening rear head. By this means the compactness of the machine is only limited by the closeness with which the heads that are in line, as those of the chucks $D^2$ and $D^4$, can be arranged. If, however, the heads were arranged with the axes of the horizontal spindles all in the same horizontal plane, they could not be thus compactly arranged, because it would be necessary to place the shafts $C^2$ and $C^4$ far enough apart to allow sufficient reach between them for the greatest retreat of the spindles E E of the heads for the chucks $D'$ and $D^3$. To avoid the necessity for thus separating the heads I arrange the rear heads with their shafts and spindles in a higher plane than those of the front heads, as clearly shown in Figs. 2 and 3. To this end the frames G G of the second and fourth heads are either lifted higher or made longer than the frames of the front heads, so that their horizontal spindles E E and horizontal shafts C are raised sufficiently to enable the spindles E E, if sufficiently prolonged or caused to retreat sufficiently to intersect the shafts $C^2$ and $C^4$, to pass clear above them. This arrangement might not be necessary with the machine fitted for tapping ordinary T-pipe fittings, as shown; but for certain purposes it is necessary to employ longer spindles, or those having a greater reach, in which case the spindles might project as far as is denoted by the dotted lines $x\ x$ in Fig. 1, so that they would interfere with the shaft $C^2$ were not the arrangement such that they pass above it.

Fig. 10 shows the chuck modified for holding a T-fitting which is formed with no enlargements or flanges on its ends. In this case the centering of the fitting is effected solely by the T-shaped recesses in a block $i'$, into which its body and branch enter when pressed up by the movable jaw. In the case of a T having end flanges the block $i'$ will be recessed to admit these flanges, so that the latter may serve for registering or centering the work as the chuck is closed. The same chuck may be used for straight thimbles or through-and-through connections or for elbows by simply removing the block $i'$ and substituting for it a block having a recess to fit the new work to be operated upon. In case the machine is used to tap elbows one of the tap-spindles E may be removed or its tap $f$ taken out. In case the machine is used to tap straight thimbles the vertical spindle E' may be removed or its tap taken out. For tapping elbows or Y-fittings wherein the axes of the bores are arranged at other intervals than ninety degrees the machine will necessarily be specially constructed with the spindles E E' arranged at correspondingly different radial intervals.

The most important feature of my present invention is the construction which enables the fittings to be tapped in more rapid succession. The speed of a tapping-machine is, as is well known, limited to a certain comparatively slow movement, which is found to produce the best work and involve the least wear of the tools. Efforts to increase the capacity of machines of this character by speeding up the taps are consequently unsuccessful. Economy in production can only be secured by economizing the time between the successive tapping operations.

The practical result of the use of my improved machine is that a considerable portion of the time is saved by rendering unnecessary the idle play heretofore necessarily given to the taps after they pass out of the work and before they re-enter the next successive piece of work.

I claim as my invention the following-defined novel features or improvements, substantially as hereinbefore specified, namely:

1. A quick-discharging chuck constructed with jaws having a recess for holding and centering rounded objects, the one an upright fixed jaw and the other an upright movable jaw, means for forcing them together to hold the work between them, and a downward discharge-passage between and beneath the jaws to enable the work to drop out immediately upon the opening of the jaws.

2. A quick-discharging chuck consisting of an upright fixed jaw, a supporting-frame therefor having uprights on opposite sides of the jaw and formed with a downward discharge passage or opening beneath the jaw, an upright movable jaw mounted between said uprights, and means for forcing the movable jaw against the fixed jaw to grip the work, whereby on opening the jaws the work may drop out immediately.

3. A quick-discharging chuck consisting of an upright fixed jaw, a supporting-frame therefor having uprights on opposite sides of the jaw and formed with a downward discharge passage or opening beneath the jaw, an upright movable jaw pivoted beneath between said uprights, so that its upper part may be thrown back from the fixed jaw, and means for forcing the movable jaw against the fixed jaw to grip the work, whereby on opening the jaws the work may drop out immediately.

4. A quick-discharging chuck constructed with jaws having a recess for holding and centering rounded objects, the one an upright fixed jaw and the other an upright movable jaw, the latter pivoted beneath, so that its upper part may be thrown back from the fixed jaw, and means for forcing it toward the fixed jaw to hold the work between them, consisting of a lever having a wedging-arm acting against the movable jaw and arranged with its heavier arm in its lowermost position when the jaws are closed, whereby the weight of the lever-arm tends to keep the chuck closed.

5. A quick-discharging chuck constructed with an upright fixed jaw and an upright pivoted movable jaw and means for forcing them together to hold the work, consisting of a lever having a wedging-arm acting against the movable jaw, and an adjustment for said lever, consisting of sliding blocks for the fulcrum-pin thereof and set-screws for adjusting said blocks to move the axis of the lever toward the movable jaw.

6. In a machine for tapping or boring small articles, the combination of a chuck, two or more tool-spindles arranged on radial axes and movable into and out of the work held in said chuck, a bevel-gear for driving each such spindle, a driving-shaft with its axis perpendicular to and intersecting the axes of the spindles, and a bevel-gear thereon meshing simultaneously with the bevel-gears on the spindles, whereby by the alternately opposite rotation of the driving-shaft the tools carried by the spindles are caused to enter and recede from the work.

7. In a machine for tapping or boring small articles, the combination, with a chuck for holding the article, of an arched frame, radial tool-spindles mounted in bearings borne by said frame, bevel-gears for rotating said spindles, a driving-shaft with its axis coincident with the intersection of the radial spindles, and a bevel-gear thereon meshing with the gears on the spindles for imparting simultaneous motion thereto, the said frame constructed with recesses and bearing-boxes constructed to be fastened in said recesses, whereby by removing said boxes the spindles may be detached and replaced by others.

8. In a machine for tapping or boring small articles, the combination, with a chuck for holding the article, two or more radial tool-spindles, bevel-gears thereon for driving them, a driving bevel-gear meshing with the gears on the spindles, and a driving-shaft on which said gear is fixed, of an arched frame carrying bearings for the tool-spindles and having a horizontal cross-frame carrying the bearing of the central driving-shaft, whereby the driving-shaft and tool-spindles are carried rigidly in invariable relative positions.

9. The combination of radial tool-spindles, their bevel-gears, boxes in which the spindles and gears have bearings, a driving-shaft and a gear thereon meshing simultaneously with the gears on the spindles, and a frame for supporting the spindles, constructed with recesses for inclosing said bearing-boxes, said recesses arranged all on the same side of the frame, and fastenings for securing the bearing-boxes thereon, whereby the removal of the boxes, spindles, and gears and their replacement by others are facilitated.

10. In a tapping-machine, the combination, with tap-spindles E E, having bevel-gears e e, of a driving-shaft C and a bevel-gear d thereon for driving the gears on the spindles E E, change-gears K, K', and L', and a tap-spindle for cutting left threads adapted to be substituted for a right-threaded spindle and having (in lieu of a bevel-gear e) a gear L, adapted to mesh with the change-gear L', whereby the left tap-spindle is revolved in the opposite direction from the right tap-spindle, which it replaces.

11. In a multiple tapping or boring machine, the combination of chucks for holding the work and working-heads, consisting each of two or more tool-spindles, gearing for driving them and a frame for supporting them, a main driving-shaft, an intervening gearing for driving the spindles of the several heads therefrom, and the heads arranged alternately toward the front and rear, a rear head being arranged between and extending partly behind two front heads, whereby the machine is rendered more compact, in the manner specified.

12. In a multiple tapping or boring machine, the combination of chucks for holding the work and working-heads consisting each of two or more tool-spindles, one or more of such spindles extending horizontally, gearing for driving them, comprising a horizontal shaft extending rearwardly from the head and a frame for supporting them, a main driving-shaft, an intervening gearing for driving the shafts of the several heads therefrom, and the heads arranged alternately toward the front and rear, a rear head being arranged between and extending partly behind two front heads and arranged with its horizontal spindle or spindles in a different horizontal plane in order to clear the driving-shafts of the front heads, in the manner substantially as specified.

13. In a machine for tapping or boring small articles, the combination of two or more tool-spindles arranged with their axes in an approximately vertical plane, with one of the spindles arranged above the work, and a chuck for holding the work, consisting of two jaws to clamp the work between them and constructed to afford a downward discharge-passage between and beneath the jaws to enable the work to drop out immediately upon opening them, and means for relatively opening and closing said jaws, whereby the work may be discharged immediately the cutting-tools clear it.

In witness whereof I have hereunto signed my name in the presence of two subscribing witnesses.

THORVALD F. HAMMER.

Witnesses:
ARTHUR C. FRASER,
JNO. E. GAVIN.